United States Patent
Kao et al.

(10) Patent No.: US 12,417,701 B2
(45) Date of Patent: Sep. 16, 2025

(54) RISK CONTROL SYSTEM AND METHOD FOR TRAFFIC DEVICES

(71) Applicant: InnoLux Corporation, Miao-Li County (TW)

(72) Inventors: Yu-Chien Kao, Miao-Li County (TW); Chueh-Yuan Nien, Miao-Li County (TW); Yi-Cheng Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 34 days.

(21) Appl. No.: 18/361,241

(22) Filed: Jul. 28, 2023

(65) Prior Publication Data

US 2024/0071225 A1 Feb. 29, 2024

(30) Foreign Application Priority Data

Aug. 30, 2022 (CN) .......................... 202211052093.3

(51) Int. Cl.
*G08G 1/097* (2006.01)
*G08G 1/07* (2006.01)

(52) U.S. Cl.
CPC ............... *G08G 1/097* (2013.01); *G08G 1/07* (2013.01)

(58) Field of Classification Search
USPC ....... 340/931, 930, 942, 953, 956, 961, 982, 340/995.13, 426.12, 431–437, 464, 340/538.11
See application file for complete search history.

(56) References Cited

U.S. PATENT DOCUMENTS

| | | | |
|---|---|---|---|
| 2008/0007418 A1* | 1/2008 | Maki | G09F 27/00 340/686.6 |
| 2010/0180754 A1* | 7/2010 | Brown | G10L 15/26 84/610 |
| 2012/0283894 A1* | 11/2012 | Naboulsi | A61B 5/18 701/1 |
| 2017/0210282 A1* | 7/2017 | Rodriguez Barros | B60Q 1/324 |
| 2020/0223506 A1* | 7/2020 | Gilles | B62J 45/414 |
| 2021/0070316 A1* | 3/2021 | Hrabak | B60W 50/10 |
| 2022/0069574 A1* | 3/2022 | Liao | H02J 1/122 |
| 2022/0144293 A1* | 5/2022 | Wu | B60W 50/0205 |
| 2022/0378110 A1* | 12/2022 | Yu | G05D 23/2401 |

FOREIGN PATENT DOCUMENTS

| | | |
|---|---|---|
| CN | 201007763 Y | 1/2008 |
| CN | 203324610 U | 12/2013 |
| CN | 111684290 A | 9/2020 |
| CN | 112466851 A | 3/2021 |
| CN | 113703205 A | 11/2021 |

* cited by examiner

*Primary Examiner* — Daniel Previl
(74) *Attorney, Agent, or Firm* — MUNCY, GEISSLER, OLDS & LOWE, P.C.

(57) ABSTRACT

A risk control system for traffic devices includes a light emitting device, a processing element and a user prompting element. The processing element is electrically connected with the light emitting device, and outputs a prompt signal. The user prompting element is electrically connected with the processing element, and receives the prompt signal.

19 Claims, 6 Drawing Sheets

RISK CONTROL SYSTEM AND METHOD FOR TRAFFIC DEVICES

CROSS-REFERENCE TO RELATED APPLICATIONS

This application claims the benefits of the Chinese Patent Application Serial Number 202211052093.3, filed on Aug. 30, 2022, the subject matter of which is incorporated herein by reference.

BACKGROUND

Field of the Disclosure

The present disclosure relates to the technical field of risk control and, more particularly, to a risk control system and method for traffic devices.

Description of Related Art

Electronic devices are currently in widespread use, and thus the electronic devices may need various forms to meet different usage scenarios. For example, current traffic devices are often equipped with electronic devices (such as display devices). In order for the display device to match the shape of the instrument panel or center console of the traffic device, the display device often needs to be bent. However, when being bent, a certain region of the display device often bears great stress, and there is a risk of break in long-term use, resulting in affecting the display operation of the display device and the driving safety of the user. In addition, there is currently no effective detection method, and users usually are aware of such when the chip breaks and the display device cannot be used, resulting in reduced driving safety.

Therefore, there is a need for a risk control system and method for traffic devices to mitigate and/or obviate the above problems.

SUMMARY

The present disclosure provides a risk control system for traffic devices. The risk control system includes a light emitting device, a processing element and a user prompting element. The processing element is electrically connected with the light emitting device, and outputs a prompt signal. The user prompting element is electrically connected with the processing element and receives the prompt signal.

The present disclosure further provides a risk control method for traffic devices. The risk control method includes the steps of: providing a light emitting device; providing a processing element electrically connected to the light emitting device to output a prompt signal; and providing a user prompting element electrically connected to the processing element to receive the prompt signal.

Other novel features of the disclosure will become more apparent from the following detailed description when taken in conjunction with the accompanying drawings.

DETAILED DESCRIPTION OF EMBODIMENT

Figure 1:
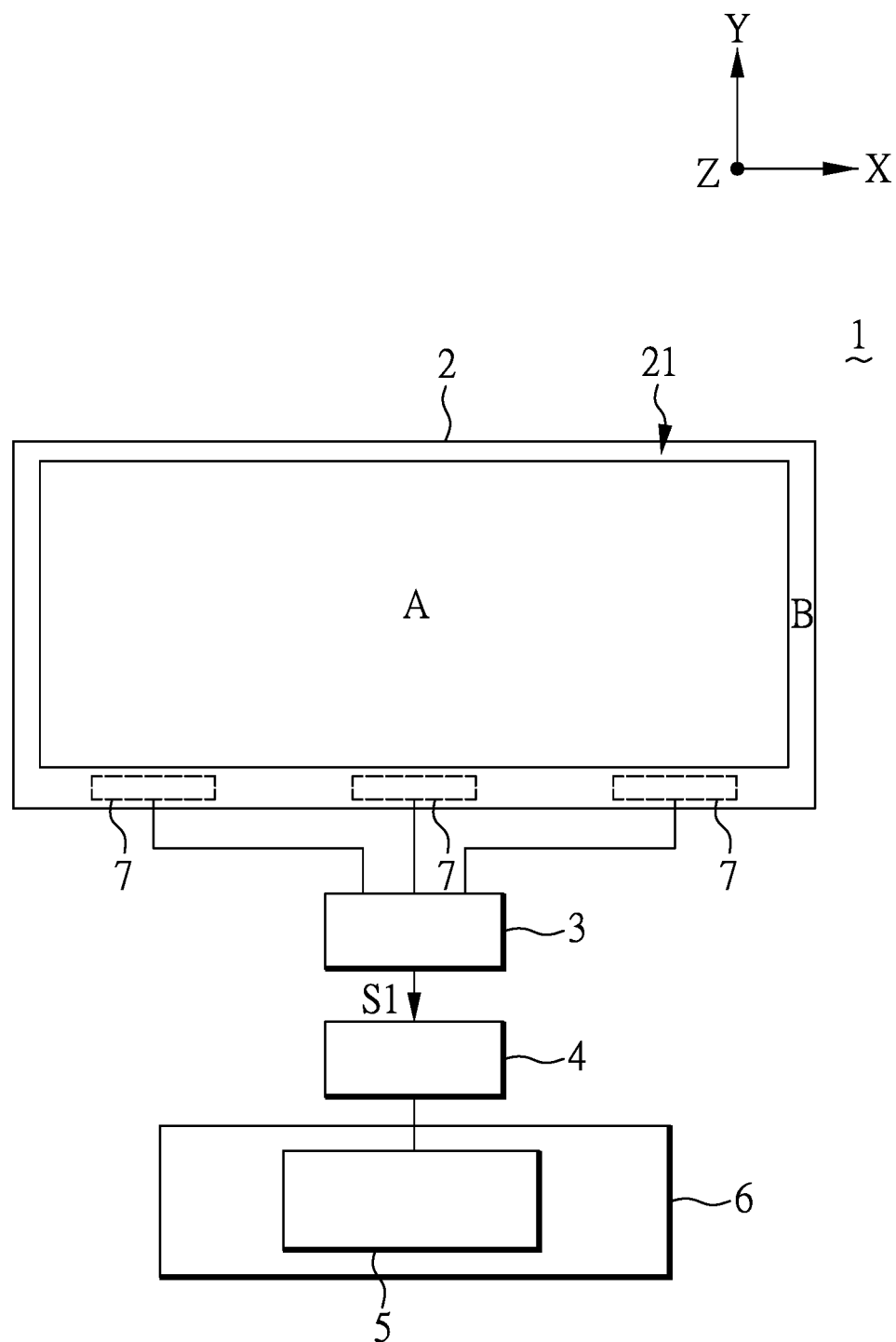
FIG. 1 is a schematic diagram illustrating the architecture of the risk control system according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It is noted that, in the specification and claims, unless otherwise specified, having "one" element is not limited to having a single said element, but one or more said elements may be provided. In addition, the description of "at least one of the element A and the element B" includes an aspect with only the element A, an aspect with only the element B, and an aspect with both the element A and the element B.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. These ordinal numbers are used only to distinguish one element with a particular name from another element with the same name.

In addition, the term "adjacent" used herein may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value and the second value" indicate that the range includes the first value, the second value, and other values between the first value and the second value.

For convenience of description, "in a direction" referred in the context may represent "approximately in said direction" or "approximately in the opposite direction of said direction", while it is not limited thereto. In addition, there may be a deviation of within about 60 degrees between the actual direction and the stated direction, while it is not limited thereto.

In addition, the technical features of different embodiments disclosed in the present disclosure may be combined to form another embodiment.

In addition, the present disclosure relates to a system with an electronic device, the electronic device may have electronic components, and the type of the electronic device may include an automotive device, a test device, a cleaning device, a foreign object removal device, a display device, a backlight device, an antenna device, a sensing device, a tiled device, a semiconductor device, a touch display, a curved display, a free shape display, or any combination of the above, while it is not limited thereto. The display device may include, for example, liquid crystal, light emitting diode, fluorescence, phosphor, other suitable display media, or a combination thereof, but it is not limited thereto. The light emitting diode may include, for example, an organic light emitting diode (OLED), mini light emitting diode (mini LED), micro light emitting diode (micro LED), or quantum dot light emitting diode (QD, which may be QLED, QDLED), or other suitable materials or any combination of the above materials, but it is not limited thereto. The display device may include a display panel or touch panel, and may be a non-self-emission display device (e.g., including liquid crystals) or a self-emission display device (e.g., including light emitting diodes). The antenna device may be a liquid crystal antenna device or a non-liquid crystal antenna device, and the sensing device may be a sensor for sensing capacitance, light, heat or ultrasonic waves, but it is not limited thereto. The electronic components may include passive components and active components, such as capacitors, resistors, inductors, diodes, transistors, and the like. The diodes may include light emitting diodes or photodiodes. The light emitting diodes may, for example, include organic light emitting diodes (OLEDs), sub-millimeter light emitting diodes (mini LEDs), micro light emitting diodes (micro LEDs) or quantum dot light emitting diodes (quantum dot LEDs), but not limited thereto. The tiled device may be, for example, a display tiled device or an antenna tiled device, but not limited thereto. It is noted that the electronic device may be any permutation and combination of the aforementioned, but not limited thereto. In addition, the electronic device may be a bendable or flexible electronic device. In addition, the shape of the electronic device may be rectangular, circular, polygonal, shape with curved edges, or other suitable shapes. The electronic device may have peripheral systems such as a drive system, a control system, a light source system, a shelf system, etc. to support a display device, an antenna device or a tiled device. For the convenience of description, a system for traffic devices is taken as an example for the system described in the following description, but the present disclosure is not limited thereto.

Please refer to FIG. 1, which is a schematic diagram of the risk control system 1 according to an embodiment of the present disclosure, wherein the risk control system 1 may be used for traffic devices, and the traffic device may be a car, electric vehicle, locomotive, bus, train, tram, high-speed rail, ship, aircraft, etc. capable of being equipped with a display device, while it is not limited thereto.

As shown in FIG. 1, the risk control system 1 includes a light emitting device 2, a processing element 3, a control element 4, and a user prompting element 5. The light emitting device 2 has a substrate 21, and the substrate 21 may include an emission area A and a non-emission area B. When viewing in a top-view direction (for example, the Z direction, or the direction opposite to the light emitting direction), the non-emission area B is adjacent to the emission area A. According to some embodiments, the non-emission area B surrounds the emission area A. In the present disclosure, the wording "surround" is defined as being disposed at the periphery; for example, the non-emission area B is disposed at the periphery of the emission area A, but it is not limited thereto. In addition, the non-emission area B is provided with at least one first area 7, wherein the first area 7 may be regarded as a circuit area or the position of a chip, but it is not limited thereto. The first area 7 includes an internal circuit area 71 (shown in FIG. 2). The light emitting device 2 and processing element 3 are electrically connected. For example, the first area 7 on the light emitting device 2 may be connected to the processing element 3. In addition, the processing element 3 and the user prompting element 5 may be connected electrically through the control element 4. The substrate 21 may be, for example, a circuit board, array substrate, thin film transistor substrate, lamp board or light bar, but it not limited thereto.

One of the features of the present disclosure is that the processing component 3 may be used to determine whether the first area 7 is broken. When the processing element 3 determines that the first area 7 is broken, the processing element 3 may provide a prompt signal S1 to the control element 4. The user prompting element 5 may indirectly receive the prompt signal S1 through the control element 4; for example, the control element 4 may receive the prompt signal S1 so as to control the user prompting element 5 to perform actions according to the prompt signal S1, but it is not limited thereto. Please refer to the description of FIG. 2 in the subsequent paragraphs for more details.

Next, details of each device or element will be described.

Regarding the light emitting device 2, in one embodiment, the type of the light emitting device 2 may include a light source, a backlight module, a display device, a self-emission device, a self-emission display device, a non-self-emission display device, while it is not limited thereto. In one embodiment, the material of the substrate 21 of the light emitting device 2 may include glass, steel or polyimide (PI), or other suitable materials that may be used as the substrate 21, while it is not limited thereto.

Regarding the processing element 3, in one embodiment, the processing element 3 may be, for example, a chip, which may include a microprocessor. The processing element 3 is used for transmitting or receiving signals, and analyzing the signals. In one embodiment, the processing element 3 may be disposed outside the first area 7, for example, on other portions of the light emitting device 2, or outside the light emitting device 2. In one embodiment, the processing element 3 may also be disposed in the first area 7, for example, on a chip substrate 73 (marked in FIG. 2) in the first area 7, and the processing element 3 may be electrically connected to or not electrically connected to the internal circuit area 71 of the first area 7. In one embodiment, the processing element 3 may also be disposed inside the control element 4. In addition, a processing element 3 may be electrically connected to one or more first areas 7 so as to determine whether the one or more first areas 7 are broken. However, the present disclosure is not limited thereto.

Regarding the control element 4, in one embodiment, the control element 4 may be, for example, any element with a control function, such as a microprocessor, a microcontroller (MCU) or an electronic control unit (ECU), while it is not limited thereto. The control element 4 is provided to transmit or receive signals, and control the action of the user prompting element 5. In one embodiment, the control element 4 may be disposed outside the first area 7, for example, on other portions of the light emitting device 2, or outside the light emitting device 2. In one embodiment, the control element 4 may be disposed on a system control end 6 of the traffic device, such as a dashboard, a vehicle equipment or a center console of the traffic device, but it is not limited thereto. In one embodiment, the control element 4 may also be disposed in the first area 7, and the control element 4 may be electrically connected to or not electrically connected to the internal circuit area 71 of the first area 7. However, the present disclosure is not limited thereto.

Regarding the user prompting element 5, in one embodiment, the type of the user prompting element 5 includes a speaker, a buzzer, a siren or a warning light, while it is not limited thereto. In one embodiment, the user prompting element 5 may be arranged on the system control end 6 of the traffic device. In one embodiment, the user prompting element 5 may also be disposed on the light emitting device 2. In one embodiment, the action of the user prompting element 5 includes sounding, beeping, alarming or warning light, etc., while it is not limited thereto. In one embodiment, the system control end 6 may be provided with one or more user prompting elements 5 of the same type or different types. However, the present disclosure is not limited thereto.

In some embodiments, at least one chip C is electrically connected to the light emitting device 2, and the chip C is disposed in the first area 7 of the substrate 21 of the light emitting device 2. The chip C may drive the light emitting device 2 or the chip C may further drive the substrate 21. The chip C may be provided with a chip substrate 73, and the internal circuit area 71 may be disposed on the chip substrate 73, wherein the internal circuit area 71 is provided with internal circuits of the chip C. According to some embodiments, the conductor structure 8 may be disposed on the chip substrate 73 and adjacent to the internal circuit area 71, but it is not limited thereto. According to some embodiments, the edge of the chip substrate 73 may be deemed as the edge of the first area 7. In one embodiment, the first area 7 may be, for example, an area for a flip-chip package, such as a chip on glass (COG) area, a chip on polyimide (chip on PI, COP) area or chip on board (COB) area, etc., while it is not limited thereto. In one embodiment, the chip C in the first area 7 may be arranged on the substrate 21 of the light emitting device 2 through anisotropic conductive film (ACF) technology or solder bumping technology, while it is not limited thereto.

Figure 2:
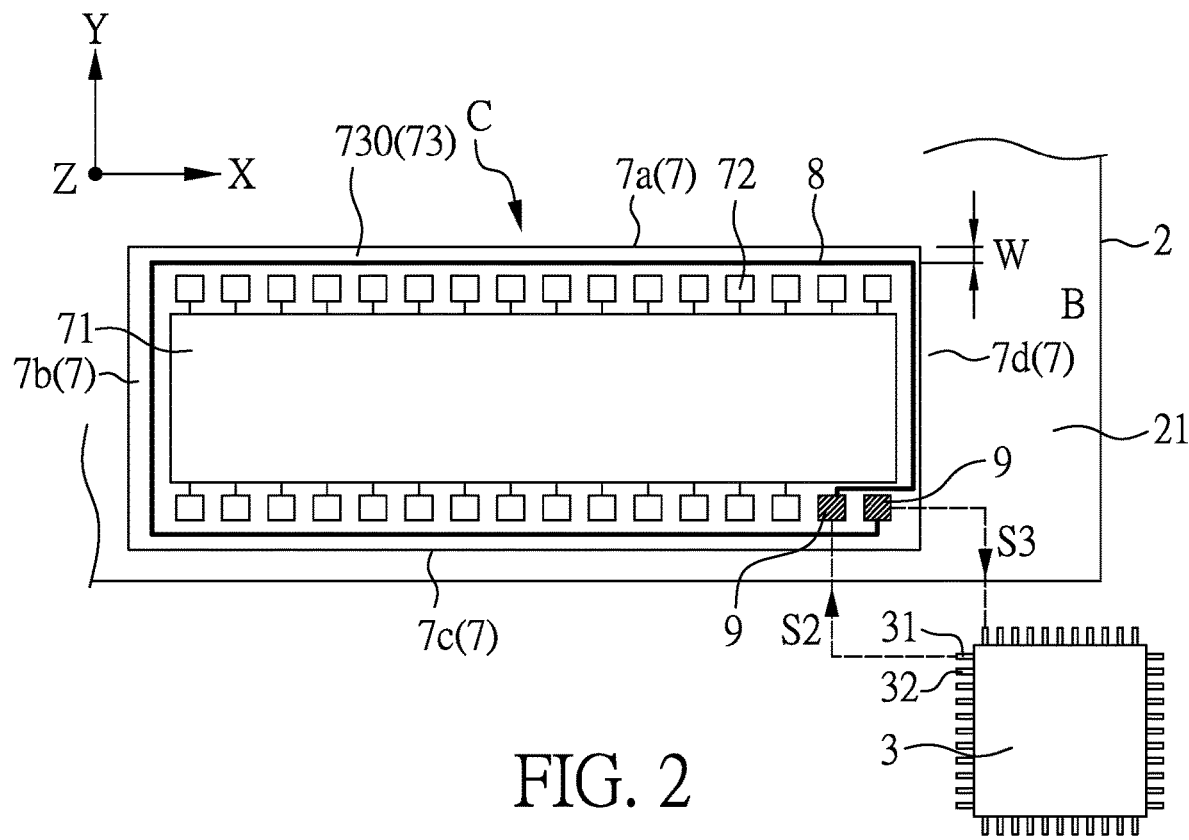
FIG. 2 is a detailed schematic diagram of the first area according to an embodiment of the present disclosure.

Next, the details of the first area 7 will be described with FIG. 2. FIG. 2 is a detailed schematic diagram of the first area 7 according to an embodiment of the present disclosure, and please refer to FIG. 1 at the same time. For clarity of description, the control element 4 and the user prompting element 5 are not shown in FIG. 2.

As shown in FIG. 2, the chip substrate 73 may be provided with an edge area 730, wherein the edge area 730 surrounds the internal circuit area 71 as viewed from the top view direction (Z direction). The outer edge of the edge area 730 may include a first edge 7a, a second edge 7b, a third edge 7c opposite to the first edge, and a fourth edge 7d opposite to the second edge. In addition, the internal circuit area 71 may be electrically connected to a plurality of conductive pads 72.

In addition, the light emitting device 2 further includes a conductor structure 8. The conductor structure 8 may be disposed on the edge area 730 of the chip substrate 73. In one embodiment, the conductor structure 8 may be used as a signal trace, but it is not limited thereto. In one embodiment, the material of the conductor structure 8 includes aluminum (Al), copper (Cu), molybdenum (Mo), molybdenum-tungsten (MoW) composite, titanium (Ti) or tin, or any combination of the above, while it is not limited thereto.

In one embodiment, viewed from the top view direction (Z direction), the conductor structure 8 is arranged on the edge area 730 of the chip substrate 73, and the conductor structure 8 surrounds the internal circuit area 71. In one embodiment, viewed from the top view direction (Z direction), the conductor structure 8 is disposed between the edges 7a~7d and the internal circuit region 71 of the first area 7. In one embodiment, in an extending direction perpendicular to one of the edges 7a~7d (such as X direction or Y direction), there is a distance between the one of the edges 7a~7d and part of the conductor structure 8, which is hereinafter referred to as the first distance W. The first distance W may also be deemed as the shortest distance between one of the edges 7a~7d and the conductor structure 8; that is, the shortest distance between the conductor structure 8 and each of the first edge 7a, the second edge 7b, the third edge 7c and the fourth edge 7d may be the first distance W, but it is not limited thereto.

Furthermore, in one embodiment, the first distance W may be greater than or equal to 1 micrometer (μm), and may be smaller than or equal to 1 millimeter (mm), that is, 1 μm≤W≤1 mm. In one embodiment, the first distance W may be greater than or equal to 1.25 micrometers, and may be smaller than or equal to 0.75 millimeters, that is, 1.25 μm≤W≤0.75 mm. In one embodiment, the first distance W may be greater than or equal to 1.5 micrometer, and may be smaller than or equal to 0.5 millimeter, that is, 1.5 μm≤W≤0.5 mm. Through the above numerical setting, it can be ensured that the conductor structure 8 is adjacent to the edges 7a~7d, which is beneficial for the processing element 3 to detect whether a break occurs at the edges 7a~7d. However, the present disclosure is not limited thereto.

In one embodiment, one end of the conductor structure 8 may be electrically connected to a pin 31 of the processing element 3 through a conductive pad 9, and the other end of the conductor structure 8 may be electrically connected to another pin 32 of the processing element 3 through another conductive pad 9, but it is not limited thereto. The conductive pads 9 and the internal circuit area 71 may be electrically or not electrically connected, but it is not limited thereto.

Figure 3:
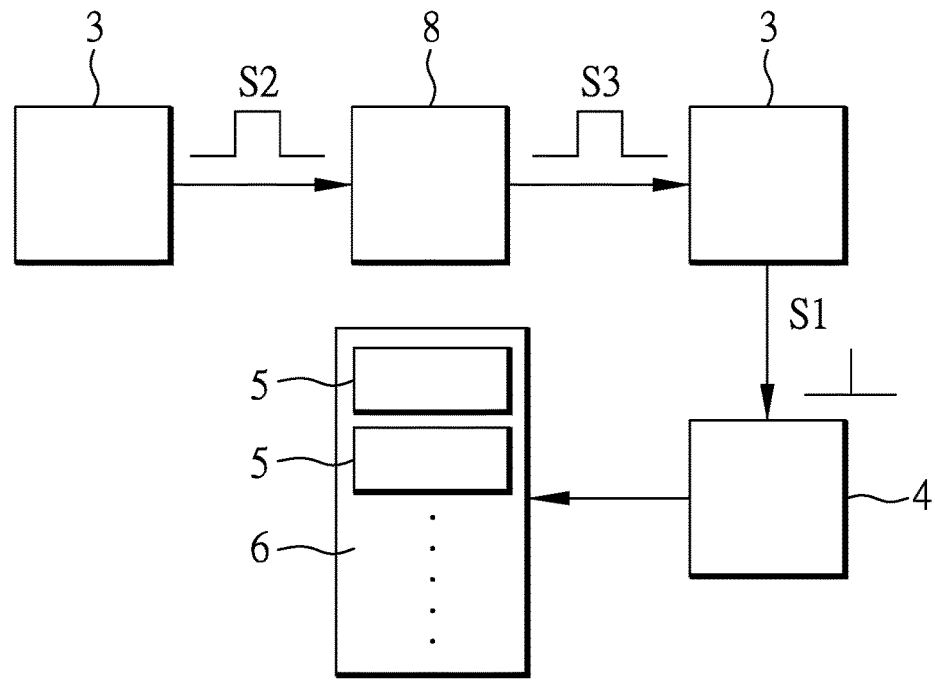
FIG. 3 is a schematic diagram illustrating the operation of the risk control system according to an embodiment of the present disclosure.

Next, the operation of the risk control system 1 will be described. FIG. 3 is a schematic diagram illustrating the operation of the risk control system 1 according to an embodiment of the present disclosure, and please refer to FIG. 1 and FIG. 2 at the same time.

As shown in FIGS. 2 and 3, the processing element 3 may provide an input signal S2 to the conductor structure 8 through the pin 31 (marked in FIG. 2), and the input signal S2 passes through the conductor structure 8 to form an output signal S3. The processing element 3 receives the output signal S3 from the conductor structure 8 through another pin 32 (marked in FIG. 2), so as to provide the prompt signal S1 according to the input signal S2 and the output signal S3. The control element 4 controls the user prompting element 5 to perform actions according to the prompt signal S1.

In one embodiment, the processing element 3 may compare the input signal S2 and the output signal S3, and determine whether to provide the prompt signal S1 according to the similarity between the input signal S2 and the output signal S3. When receiving the prompt signal S1, the control element 4 may control the user prompting element 5 to perform actions (such as sounding an alarm or turning on a warning lamp, but not limited thereto). In other words, the processing element 3 may determine whether the first area 7 is broken or abnormal according to the input signal S2 and the output signal S3. In the present disclosure, "comparing the input signal S2 and the output signal S3" may be, for example, comparing whether there is a difference in voltage or impedance, while is not limited thereto. In addition, in one embodiment, the prompt signal S1 may be a pulse signal, but it is not limited thereto.

In one embodiment, when the output signal S3 is greater than or equal to 0.9 times the input signal S2 (that is, 0.9*S2≤S3), the processing element 3 does not provide a prompt signal to the control element 4, so that the user prompting element 5 does not perform actions. On the contrary, when the output signal S3 is smaller than 0.9 times the input signal S2 (that is, 0.9*S2>S3), the processing element 3 provides a prompt signal to the control element 4, and the control element 4 controls the user prompting element 5 to perform actions. In one embodiment, when the output signal S3 is smaller than 0.925 times the input signal S2 (that is, 0.925*S2>S3), the processing element 3 provides a prompt signal to the control element 4, and the control element 4 controls the user prompting element 5 to perform actions. In one embodiment, when the output signal S3 is smaller than 0.95 times the input signal S2 (that is, 0.95*S2>S3), the processing element 3 provides a prompt signal S1 to the control element 4, and the control element 4 controls the user prompting element 5 to perform actions. However, the present disclosure is not limited thereto.

The reason for the above design is that the first area 7 usually starts to be broken from the edge to the inside and, when the similarity between the output signal S3 and the input signal S2 is low, it indicates that there are a lot of loss or disconnections as the input signal S2 passes through the conductive structure 8, and also indicates that the edges 7a~7d of the first area 7 are likely to be broken, whereby the processing element 3 may determine whether the first area 7 is broken, and the risk control system 1 may notify the user of such through the user prompting element 5.

As a result, when the first area 7 just starts to be broken (for example, when it has not yet been broken into the internal circuit area 7), the risk control system 1 may detect this and notify the user in real time, so as to greatly reduce the risk of using the broken first area 7 thereby improving the safety of using the traffic device.

In addition, in one embodiment, the processing element 3 may provide the input signal S2 to the conductor structure 8 when the light emitting device 2 is turned on; that is, the risk control system 1 may detect whether the first area 7 is broken or not when the light emitting device 2 is turned on. In one embodiment, the processing element 3 may periodically provide the input signal S2 to the conductor structure 8; that is, the risk control system 1 may periodically detect whether the first area 7 is broken or not. In one embodiment, when the light emitting device 2 is a display device, the processing element 3 may provide the input signal 2 to the conductor structure 8 when the display device performs frame refreshing; that is, the risk control system 1 may detect whether the first area 7 is broken or not when the display device performs frame refreshing. However, the present disclosure is not limited thereto.

Accordingly, the operation of the risk control system 1 can be understood.

Figure 4:
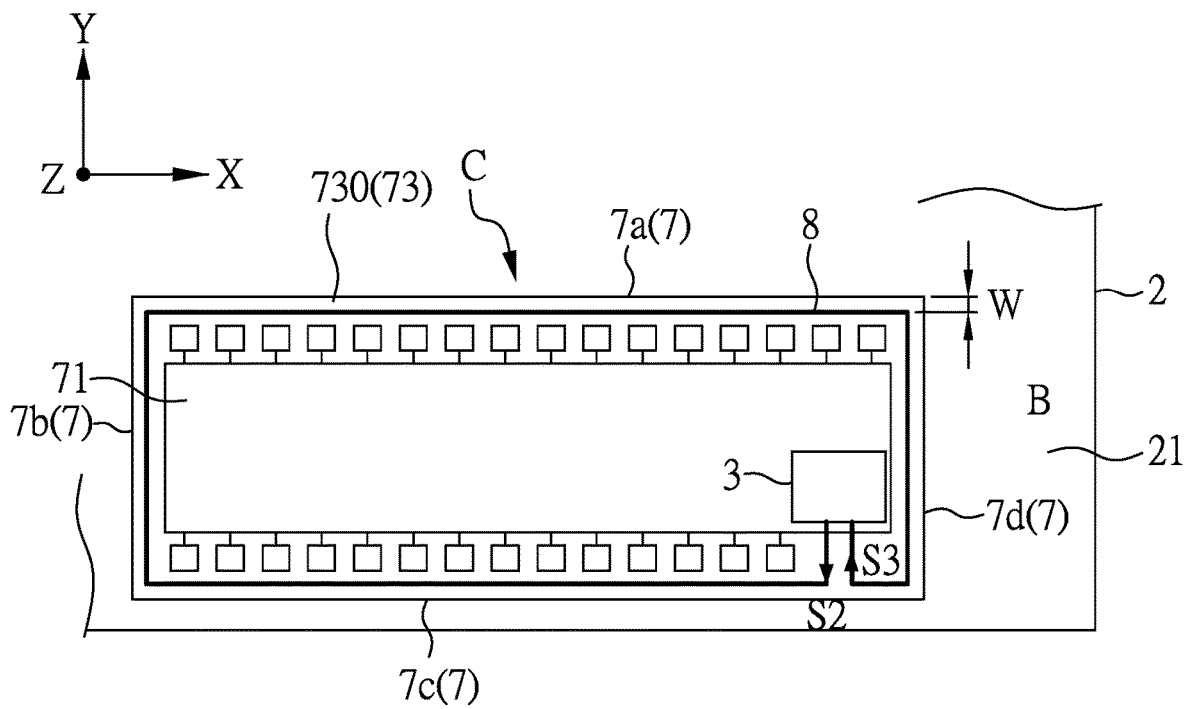
FIG. 4 is a detailed schematic diagram of the first area according to another embodiment of the present disclosure.

The first area 7 of the present disclosure may also have different implementation aspects. FIG. 4 is a detailed schematic diagram of the first area 7 according to another embodiment of the present disclosure, and please refer to FIG. 1 to FIG. 3 at the same time, wherein part of the features of the embodiment of FIG. 4 can be known from the description of the embodiment in FIG. 2, and thus the following description will mainly focus on the differences.

As shown in FIG. 4, the processing element 3 of this embodiment is arranged in the first area 7, for example, may be arranged in the internal circuit area 71. It is noted that, although the processing element 3 is arranged in the internal circuit area 71, the processing element 3 may be electrically connected or may not be electrically connected to the internal circuit area 71. In addition, the processing element 3 may be electrically connected to both ends of the conductor structure 8 to provide an input signal S2 to the conductor structure 8 and receive an output signal S3 from the conductor structure 8. There may be no conductive pads 9 arranged between the processing element 3 and the conductor structure 8, but it is not limited thereto.

Similar to the embodiment of FIG. 2, in the embodiment of FIG. 4, viewed from the top view direction (Z direction), the conductor structure 8 is adjacent to the edges 7a~7d of the first area 7 and surrounds the internal circuit area 71. In addition, the shortest distance between the conductor structure 8 and each of the edges 7a~7d of the first area 7 may also be the first distance W, and the details of the first distance W can be known from the description of the embodiment of FIG. 2, but not limited thereto.

Figure 5:
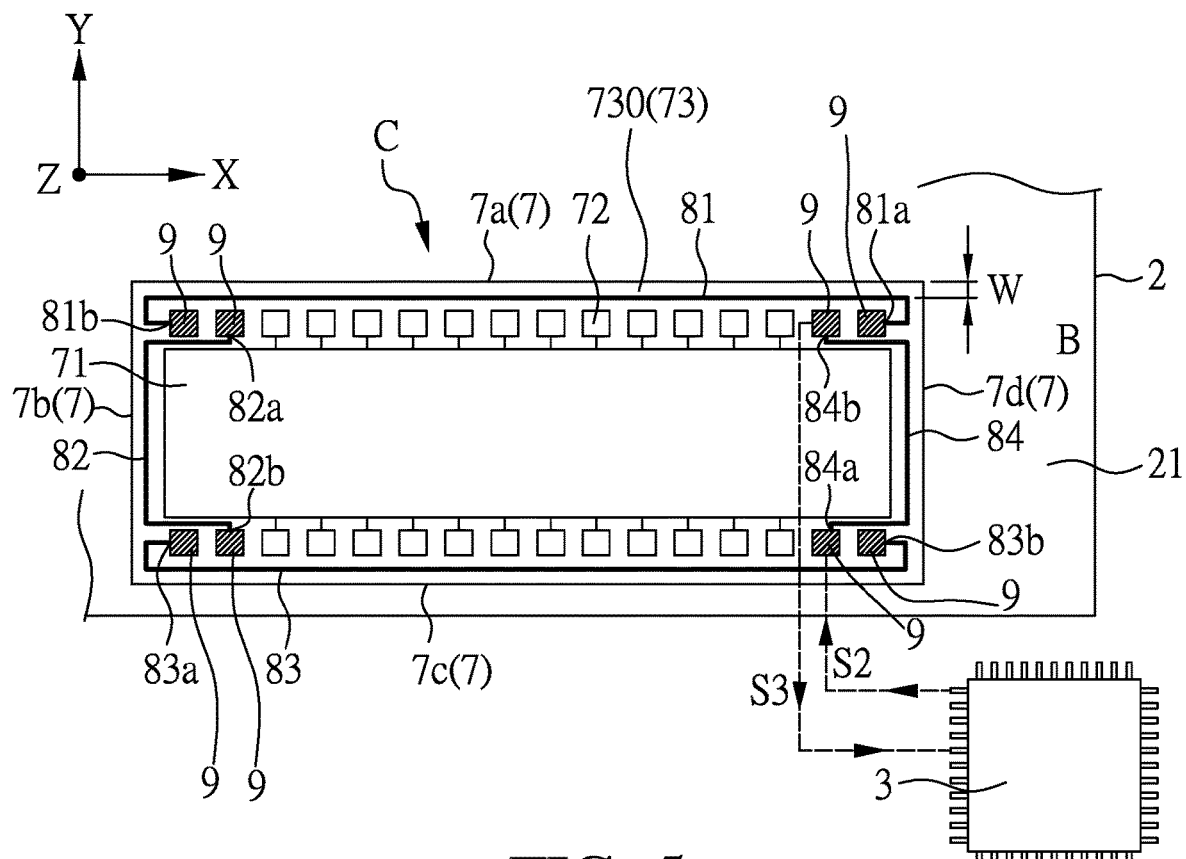
FIG. 5 is a detailed schematic diagram of the first area according to still another embodiment of the present disclosure.

The first area 7 of the present disclosure may also have different implementation aspects. FIG. 5 is a detailed schematic diagram of the first area 7 according to still another embodiment of the present disclosure, and please refer to FIG. 1 to FIG. 3 at the same time, wherein some features of the embodiment of FIG. 5 can be known from the description of the embodiment of FIG. 2, and thus the following description will mainly focus on the differences.

As shown in FIG. 5, the first area 7 of the present embodiment is provided with a plurality of conductor structures, such as a first conductor structure 81, a second conductor structure 82, a third conductor structure 83 and a fourth conductor structure 84. The first conductor structure

81 is arranged between the first edge 7*a* and the internal circuit area 71, and is adjacent to the first edge 7*a*. The second conductor structure 82 is arranged between the second edge 7*b* and the internal circuit area 71, and is adjacent to the second edge 7*b*. The third conductor structure 83 is arranged between the third edge 7*c* and the internal circuit area 71, and is adjacent to the third edge 7*c*. The fourth conductor structure 84 is arranged between the fourth edge 7*d* and the internal circuit area 71, and is adjacent to the fourth edge 7*d*.

In one embodiment, in an extending direction (e.g., Y direction) perpendicular to the first edge 7*a*, there is a first distance W between the first edge 7*a* and the first conductor structure 81. In an extending direction (e.g., X direction) perpendicular to the second edge 7*b*, there is a first distance W between the second edge 7*b* and the second conductor structure 82. In an extending direction (e.g., Y direction) perpendicular to the third edge 7*c*, there is a first distance W between the third edge 7*c* and the third conductor structure 83. In an extending direction (e.g., X direction) perpendicular to the fourth edge 7*d*, there is a first distance W between the fourth edge 7*d* and the fourth conductor structure 84. The details of the first distance W can be known from the description of the embodiment of FIG. 2, and thus a detailed description is deemed unnecessary.

In one embodiment, a first end 81*a* and a second end 81*b* of the first conductor structure 81, a first end 82*a* and a second end 82*b* of the second conductor structure 82, a first end 83*a* and a second end 83*b* of the third conductor structure 83, and a first end 84*a* and a second end 84*b* of the fourth conductor structure 84 may respectively be electrically connected to different pins of the processing element 3 through the conductive pads 9. It is noted that, in FIG. 5, the electrical connection between the third conductor structure 83 and the processing element 3 is taken as an example, while the electrical connection between other conductor structures 81, 82, 84 and the processing element 3 are not shown in order to make the drawing clear. The processing element 3 may transmit the input signal S2 to the first end 81*a* of the first conductor structure 81, the first end 82*a* of the second conductor structure 82, the first end 83*a* of the third conductor structure 83, and the first end 84*a* of the fourth conductor structure 84, and receive the output signal S3 respectively from the second end 81*b* of the first conductor structure 81, the second end 82*b* of the second conductor structure 82, the second end 83*b* of the third conductor structure 83 and the second end 84*b* of the fourth conductor structure 84.

Please refer to FIG. 3 and FIG. 5 at the same time. In one embodiment, the processing element 3 may compare the similarity between the input signal S2 and the output signal S3 from the first conductor structure 81, and determine whether to provide the prompt signal S1 to the control element 4. Alternatively, the processing element 3 may compare the similarity between the input signal S2 and the output signal S3 from the second conductor structure 82, and determine whether to provide the prompt signal S1 to the control element 4. Alternatively, the processing element 3 may compare the similarity between the input signal S2 and the output signal S3 from the third conductor structure 83, and determine whether to provide the prompt signal S1 to the control element 4. Alternatively, the processing element 3 may compare the similarity between the input signal S2 and the output signal S3 from the fourth conductor structure 84, and determine whether to provide the prompt signal S1 to the control element 4. That is, as long as the similarity of any one of the aforementioned comparisons is lower than a predetermined value (please refer to the description of the embodiment of FIG. 2 for the predetermined value), it indicates that the edges 7*a*~7*d* are likely to be broken, so that the processing element 3 may immediately provide the prompt signal S1 to the control element 4 thereby enabling the user prompting element 5 to perform actions.

As a result, the risk control system 1 may separately detect whether each edge 7*a*~7*d* is broken or not. However, the present disclosure is not limited thereto.

Figure 6:
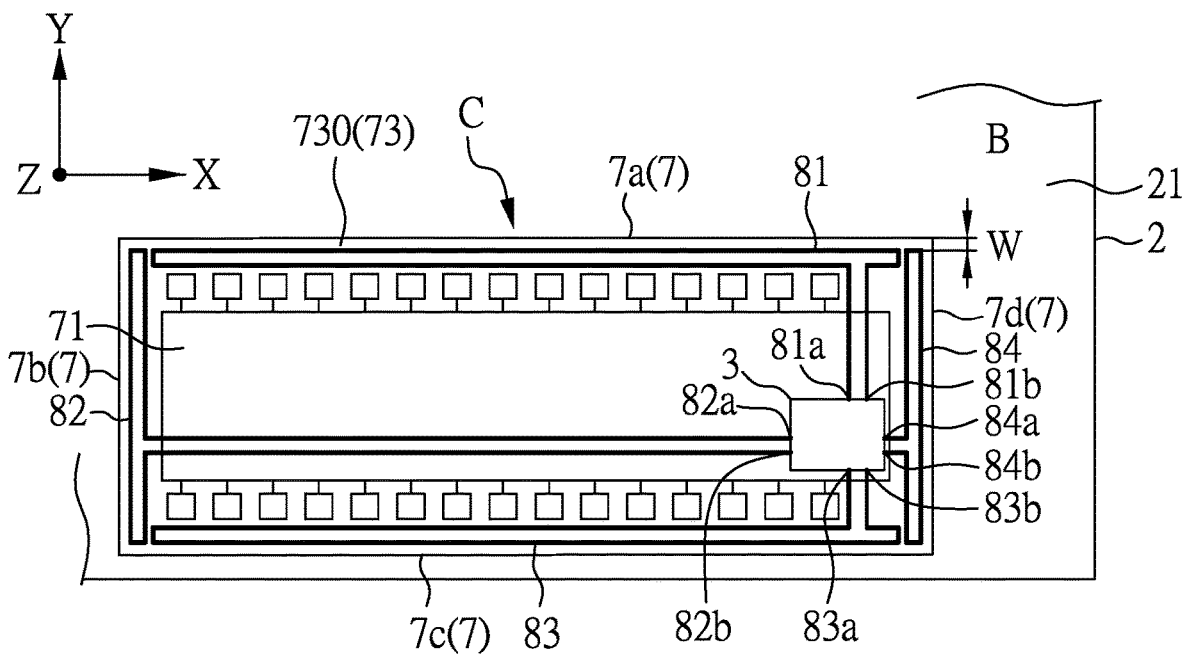
FIG. 6 is a detailed schematic diagram of the first area according to yet another embodiment of the present disclosure.

The first area 7 of the present disclosure may also have different implementation aspects. FIG. 6 is a detailed schematic diagram of the first area 7 according to yet another embodiment of the present disclosure, and please refer to FIG. 1 to FIG. 3, and FIG. 5 at the same time, wherein part of the features of the embodiment of FIG. 6 can be known from the description of the embodiment of FIG. 5, and thus the following description will mainly focus on the differences.

The embodiment of FIG. 6 differs from the embodiment of FIG. 5 in that the processing element 3 of the embodiment of FIG. 6 is arranged in the internal circuit area 71. With the processing element 3 arranged in the internal circuit area 71, the first end 81*a* and the second end 81*b* of the first conductor structure 81 are electrically connected to the processing element 3, and the first conductor structure 81 is configured to be a loop structure partially extending along the first edge 7*a*, and partially extending along the fourth edge 7*d*, wherein, in an extending direction (e.g., Y direction) perpendicular to the first edge 7*a*, the shortest distance between the first edge 7*a* and the first conductor structure 81 is the first distance W. The first end 82*a* and the second end 82*b* of the second conductor structure 82 are electrically connected to the processing element 3, and the second conductor structure 82 is configured to be a loop structure partially extending along the second edge 7*b*, and partially extending along the third edge 7*c*, wherein, in an extending direction perpendicular to the second edge 7*b* (e.g., X direction), the shortest distance between the second edge 7*b* and the second conductor structure 82 is the first distance W. The first end 83*a* and the second end 83*b* of the third conductor structure 83 are electrically connected to the processing element 3, and the third conductor structure 83 is configured to be a loop structure partially extending along the third edge 7*c*, and partially extending along the fourth edge 7*d*, wherein, in an extending direction perpendicular to the third edge 7*c* (e.g., Y direction), the shortest distance between the third edge 7*c* and the third conductor structure 83 is the first distance W. The first end 84*a* and the second end 84*b* of the fourth conductor structure 84 are electrically connected to the processing element 3, and the fourth conductor structure 84 is configured to be a loop structure partially extending along the fourth edge 7*d*, and partially extending along the third edge 7*c*, wherein, in an extending direction perpendicular to the fourth edge 7*d* (e.g., X direction), the shortest distance between the fourth edge 7*d* and the fourth conductor structure 84 is the first distance W. The details of the first distance W can be known from the description of the embodiment of FIG. 5.

In addition, the processing element 3 may detect whether each edge 7*a*-7*d* is broken or not according to the input signal S2 and the output signal S3 of each conductor structure 81~84, and the details thereof can be known by referring to the description of the embodiment of FIG. 5. However, the present disclosure is not limited thereto.

As a result, the design of the processing element 3 for detection of separate areas may be realized.

Next, the arrangement of the processing element 3 and the control element 4 will be described.

Figure 7:
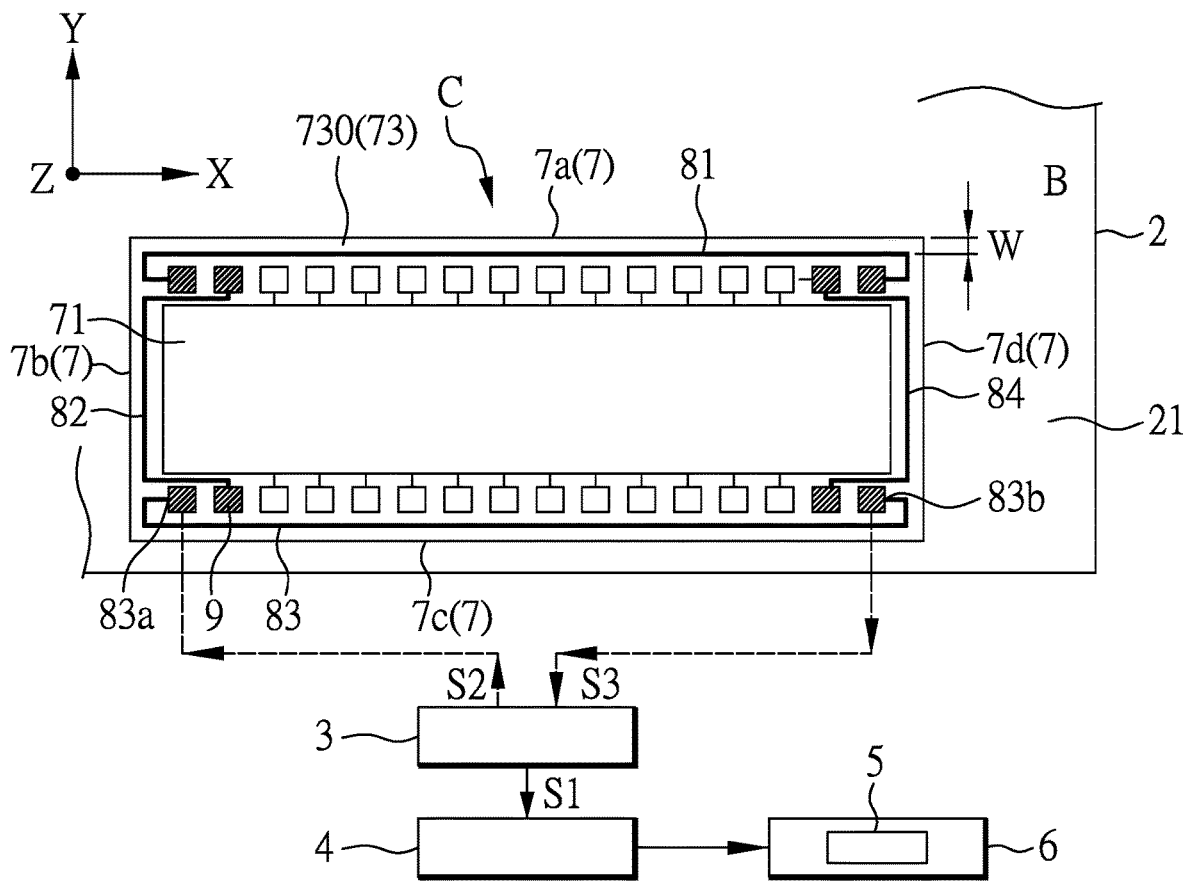
FIG. 7 is a schematic diagram illustrating the configuration of the light emitting device, processing element, control element and user prompting element according to an embodiment of the present disclosure.

FIG. 7 is a schematic diagram illustrating the configuration of the light emitting device 2, the processing element 3, the control element 4 and the user prompting element 5 according to an embodiment of the present disclosure, and please refer to FIG. 1 to FIG. 6 at the same time. It is noted that, in FIG. 7, the first area 7 of the embodiment of FIG. 5 is taken as an example, and those skilled in the art can be aware of the situation of other embodiments in combination with the embodiment of FIG. 7.

As shown in FIG. 7, the two ends (such as 83*a*, 83*b*) of each conductor structure 81~84 (such as the third conductor structure 83) may be electrically connected to the processing element 3 through the conductive pads 9 (for making the drawing clear, in FIG. 7, the electrical connection between the third conductor structure 83 and the processing element 3 is taken as an example). The processing element 3 determines whether to provide the prompt signal S1 according to the input signal S2 inputted to each conductor structure 81~84 and the output signal S3 outputted from each conductor structure 81~84. When the control element 4 receives the prompt signal S1, the control element 4 may control the user prompting element 5 to perform actions. In this embodiment, the processing element 3 and the control element 4 are provided separately, but it is not limited thereto.

Figure 8:
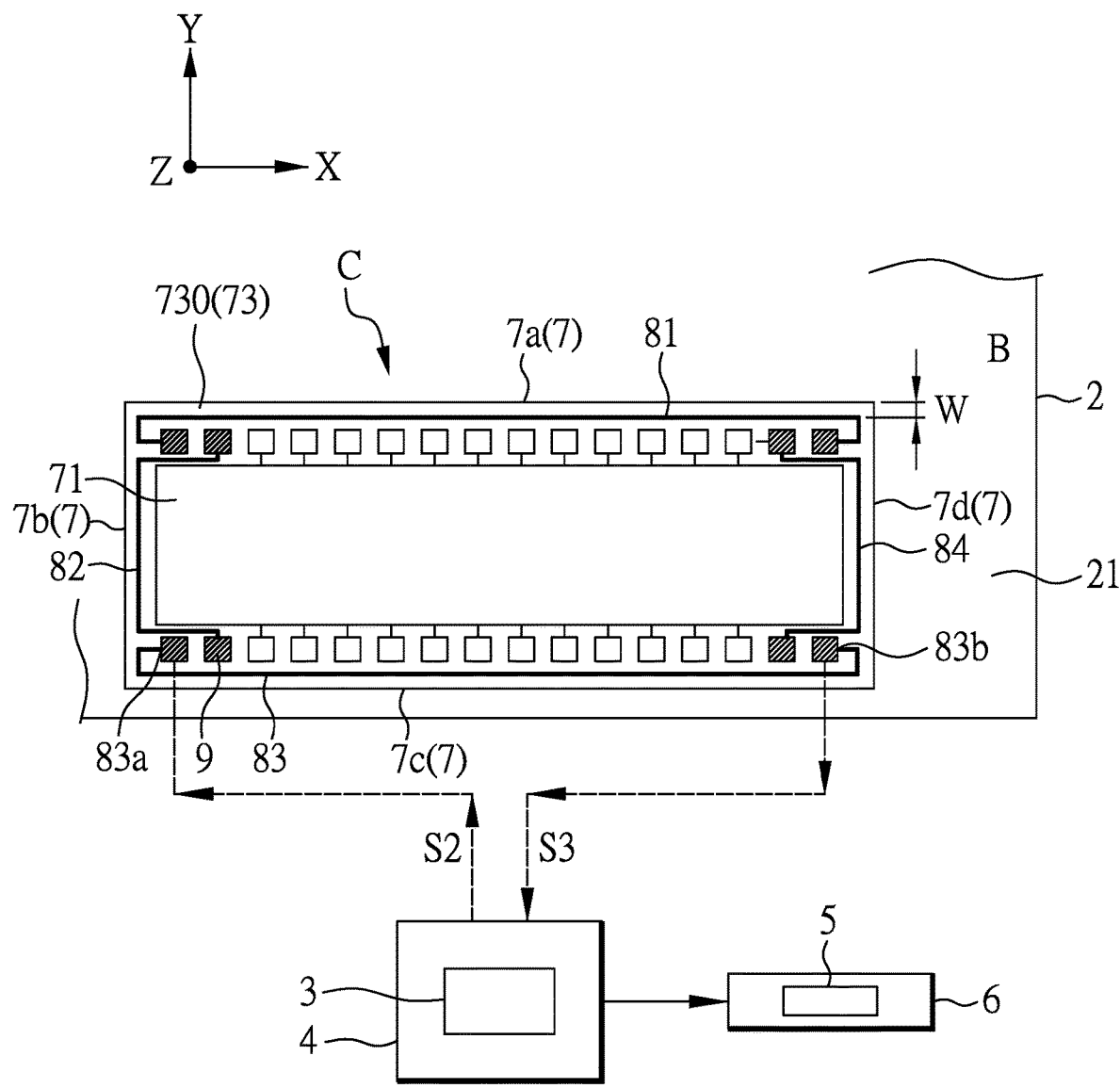
FIG. 8 is a schematic diagram illustrating the configuration of the light emitting device, processing element, control element and user prompting element according to another embodiment of the present disclosure.

FIG. 8 is a schematic diagram illustrating the configuration of the light emitting device 2, the processing element 3, the control element 4, and the user prompting element 5 according to another embodiment of the present disclosure, and please refer to FIG. 1 to FIG. 7 at the same time. It is noted that, in FIG. 8, the first area 7 of the embodiment of FIG. 5 is taken as an example, while those skilled in the art can be aware of the situation of other embodiments in combination with the embodiment of FIG. 8.

The embodiment of FIG. 8 is similar to the embodiment of FIG. 7 except that, in the embodiment in FIG. 8, the processing element 3 is integrated into the control element 4, for example, the processing element is arranged in the control element, but it is not limited thereto.

Next, the structural details of the first area 7 and the conductor structure 8 will be described.

Figure 9A:
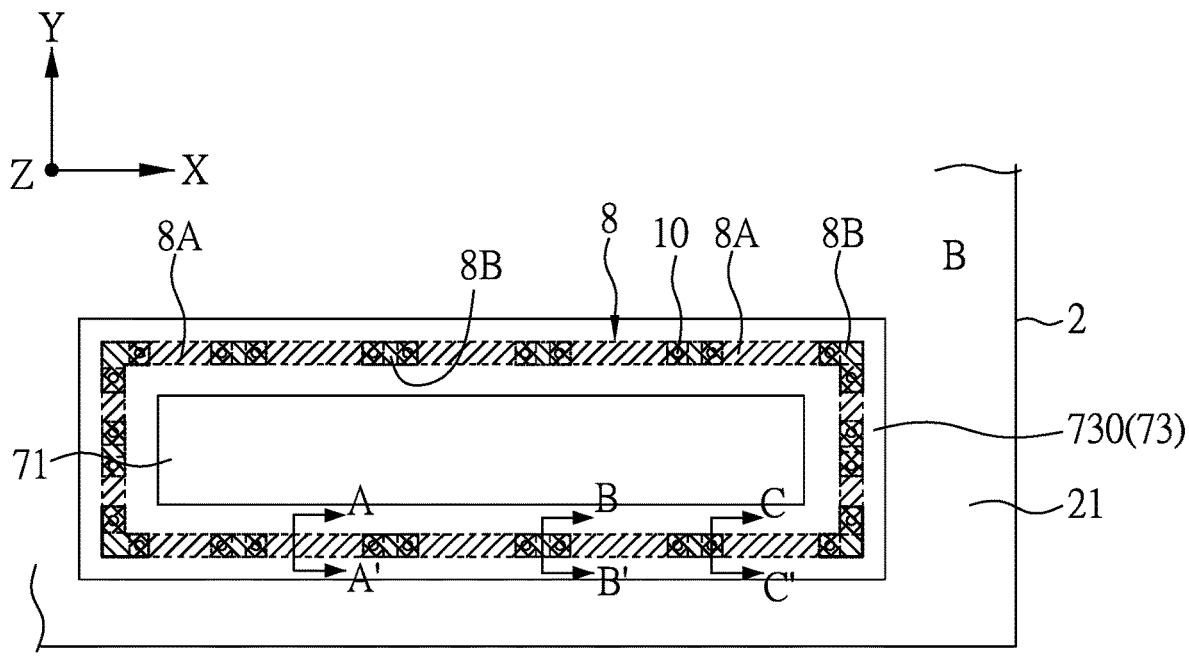
FIG. 9A is a schematic diagram of the first area and conductive structure according to an embodiment of the present disclosure.
Figure 9B:
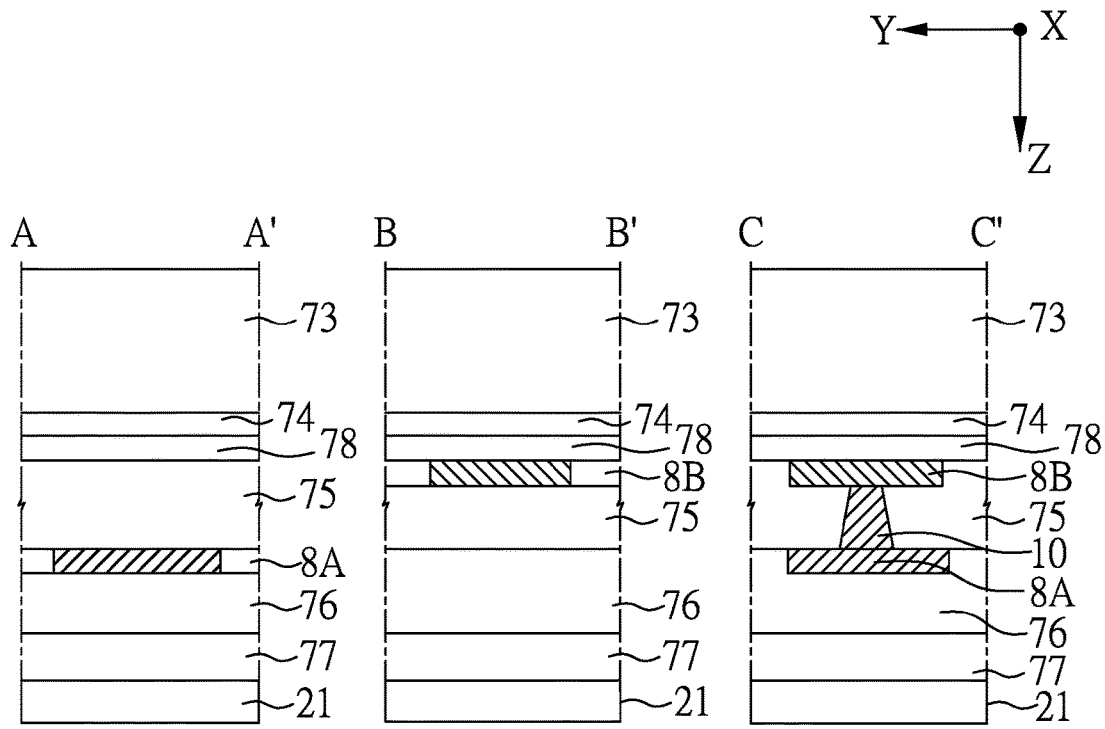
FIG. 9B is a cross-sectional view of the first area and conductive structure of FIG. 9A taken along the section line A-A', the section line B-B' and the section line C-C'.

FIG. 9A is a schematic diagram of the first area 7 and the conductor structure 8 according to an embodiment of the present disclosure, and please refer to FIG. 1 and FIG. 2 at the same time. FIG. 9B is a cross-sectional view of the first area 7 and the conductor structure 8 of FIG. 9A taken along the section line A-A', the section line B-B' and the section line C-C'.

As shown in FIG. 9A, viewed from the top view direction (e.g., Z direction), a conductor structure 8 may include a plurality of metal layers, such as a plurality of first metal layers 8A and a plurality of second metal layers 8B. As shown in FIG. 9A, in the top view direction, the first metal layer 8A may at least partially overlap with the second metal layer 8B, and there is a contact hole 10 at the overlapping portion of the two. A conductor may be provided in the contact hole 10 so that the first metal layer 8A is electrically connected to the second metal layer 8B. As shown in FIG. 9B, viewed from the cross-sectional direction, the first metal layer 8A and the second metal layer 8B have different heights in a direction opposite to the Z direction, that is, are disposed at different layers in the first area 7.

As shown in FIG. 9A and FIG. 9B, viewed from the cross-sectional direction, the first area 7 includes a chip substrate 73, a first connection layer 74, a first insulation layer 75, a second insulation layer 76, a third insulation layer 78 (e.g., an inorganic layer) and a second connection layer 77. In the top view direction, the first connection layer 74 is arranged between the chip substrate 73 and the first insulation layer 75, the first connection layer 74 is arranged between the chip substrate 73 and the third insulation layer 78, the third insulation layer 78 is arranged between the first connection layer 74 and the first insulation layer 75, the first insulation layer 75 is arranged between the third insulation layer 78 and the second insulation layer 76, the second insulation layer 76 is arranged between the first insulation layer 75 and the second connection layer 77, and the second connection layer 77 is arranged between the second insulation layer 76 and the substrate 21 of the light emitting device 2. In addition, in view of the cross section formed by the section line A-A', the first metal layer 8A is arranged between the second insulation layer 76 and the first insulation layer 75. In view of the cross section formed by the section line B-B', the second metal layer 8B is arranged between the third insulation layer 78 and the first insulation layer 75. In view of the cross section formed by section line C-C', the first metal layer 8A is arranged between the second insulation layer 76 and the first insulation layer 75, and the second metal layer 8B is arranged between the third insulation layer 78 and the first insulation layer 78. Moreover, the first metal layer 8A and the second metal layer 8B are electrically connected through the conductor disposed inside the contact hole 10. As shown in FIG. 9B, the conductor structure 8 may be a multi-layer metal layer. It is noted that, in other embodiments, the conductor structure 8 may be a single-layer metal layer.

In one embodiment, the material of the chip substrate 73 may be a wafer, while it is not limited thereto. In another embodiment, the material of the chip substrate 73 may be glass, while it is not limited thereto.

In one embodiment, the first area 7 may be arranged on the substrate 21 of the light emitting device 2 through the anisotropic conductive film (ACF) technology or the solder bumping technology, while it is not limited thereto.

In one embodiment, each of the first connection layer 74 and the second connection layer 77 may include one or more metal layers and/or one or more insulation layers, wherein the material of the metal layer may include aluminum, copper, molybdenum, molybdenum-tungsten composite, titanium or tin, or any combination of the above, but it is not limited thereto. The material of the insulation layer may include silicon oxide (SiOx), silicon nitride (SiNx), silicon oxynitride (SiON), aluminum oxide ($Al_2O_3$), polyimide, photosensitive polyimide (PSPI) or ajinomoto build-up film (ABF), etc., while it is not limited thereto, and may be manufactured through sputtering, photolithography or laser process, etc., while it is not limited thereto. In one embodiment, the metal layers of the first connection layer 74 and the second connection layer 77 may form part of the internal circuit area 70, but it is not limited thereto.

In one embodiment, the material of the first insulation layer 75 and the second insulation layer 76 may include silicon oxide, silicon nitride, silicon oxynitride, aluminum oxide, polyimide, photosensitive polyimide or ajinomoto build-up film, etc., while it is not limited thereto, and may be manufactured by sputtering, photolithography, or laser process, etc., while it is not limited thereto.

In addition, please refer to FIG. 1 and FIG. 9B. In one embodiment, when the light emitting device 2 is a display device, its emission area A may include a gate electrode and a data electrode. In the Z direction, the first metal layer 8A or the second metal layer 8B and the gate electrode or the data electrode may be disposed at different layers, that is, at different heights, but it is not limited thereto.

As a result, the structural features of the first area 7 and the conductor structure 8 can be understood.

In addition, the present disclosure also provides a risk control method, which may be implemented through the risk control system 1. The method includes the steps of: providing a light emitting device 2; providing a processing element 3 electrically connected to the light emitting device 2 to output a prompt signal S1; and providing a user prompting element 5 electrically connected to the processing element 3 for receiving the prompt signal S1 through the control element 4 and performing actions according to the prompt signal S1. The details of the above steps can be known by referring to the description of the foregoing embodiments of the risk control system 1, and thus a detailed description is deemed unnecessary. It is noted that the above steps are just examples and, as long as it is reasonable, the order of the steps may be adjusted according to the requirements or the above steps may be increased or decreased according to the requirements. Accordingly, the risk control method can be understood.

In one embodiment, the present disclosure may at least be used as proof of whether an object falls within the scope of patent protection by comparing the presence or absence of components in the risk control system 1 and/or the configuration of the components, while it is not limited thereto. In addition, an optical microscope (OM) or a scanning electron microscope (SEM) may be used to observe the components, while it is not limited thereto.

Thus, the risk control system disclosed in the present disclosure may be used to detect whether the light emitting device, the substrate or the chip substrate of the traffic device is broken or abnormal, so as to solve the problems of the prior art. Alternatively, the risk control system may notify the user in real time, thereby preventing broken components from being used. Alternatively, through the configuration of the conductor structure of the present disclosure, the present disclosure may detect breaks when the light emitting device, the substrate, the first area or the chip substrate just starts to be broken.

The details or features of the various embodiments disclosed in the present disclosure may be mixed and matched as long as they do not violate the spirit of the invention or conflict with each other.

The aforementioned specific embodiments should be construed as merely illustrative, and not limiting the rest of the present disclosure in any way.

The invention claimed is:

1. A risk control system for traffic devices, comprising:
a light emitting device;
a processing element electrically connected to the light emitting device for outputting a prompt signal;
a user prompting element electrically connected to the processing element for receiving the prompt signal; and
a chip electrically connected to the light emitting device, wherein the chip includes:
a chip substrate having an edge area; and
a conductor structure arranged on the edge area, wherein the conductor structure is electrically connected to the processing element.

2. The risk control system as claimed in claim 1, further comprising an internal circuit area arranged on the chip substrate, wherein the conductor structure is arranged to surround the internal circuit area when viewed from a top view direction.

3. The risk control system as claimed in claim 2, wherein part of the conductor structure is disposed between an edge of the chip substrate and the internal circuit area, and there is a distance between the edge and the conductor structure in an extending direction perpendicular to the edge, where the distance is greater than or equal to 1 micrometer and smaller than or equal to 1 millimeter.

4. The risk control system as claimed in claim 2, wherein the processing element is arranged on the chip substrate.

5. The risk control system as claimed in claim 2, wherein the processing element is arranged outside the light emitting device.

6. The risk control system as claimed in claim 2, wherein the conductor structure includes a first metal layer and a second metal layer, and the first metal layer and the second metal layers are electrically connected through a contact hole when viewed from a cross-sectional direction.

7. The risk control system as claimed in claim 2, wherein the internal circuit area is electrically connected to a plurality of conductive pads, and one end of the conductor structure is electrically connected to one pin of the processing element through a conductive pad.

8. The risk control system as claimed in claim 1, wherein a type of the user prompting element includes a speaker, a buzzer, a siren or a warning light.

9. The risk control system as claimed in claim 1, wherein the processing element provides the prompt signal according to an input signal and an output signal, in which, the user prompting element does not perform actions when the output signal is greater than or equal to 0.9 times the input signal, and the user prompting element performs actions when the output signal is smaller than 0.9 times the input signal.

10. The risk control system as claimed in claim 9, wherein the processing element provides the input signal to the conductor structure through a pin, the input signal passes through the conductor structure to form the output signal, the processing element receives the output signal from the conductor structure through another pin.

11. The risk control system as claimed in claim 10, wherein the processing element provides the input signal to the conductor structure when the light emitting device is turned on.

12. The risk control system as claimed in claim 10, wherein the processing element periodically provides the input signal to the conductor structure.

13. The risk control system as claimed in claim 10, wherein the light emitting device is a display device, and the processing element provides the input signal to the conductor structure when the display device performs frame refreshing.

14. The risk control system as claimed in claim 9, further comprising a control element, which controls the user prompting element to perform actions according to the prompt signal.

15. The risk control system as claimed in claim 1, wherein the light emitting device has a substrate, and the substrate includes an emission area and a non-emission area, in which, viewed from a top view direction, the non-emission area is adjacent to the emission area, the non-emission area is provided with at least one first area, and the chip substrate is disposed in the first area.

16. The risk control system as claimed in claim 1, wherein the chip substrate has an internal circuit area, and the edge area surrounding surrounds the internal circuit area, wherein the edge area includes a first edge, a second edge, a third edge opposite to the first edge, and a fourth edge opposite the second edge; and the chip further comprises a first conductor structure, a second conductor structure, a third conductor structure and a fourth conductor structure, wherein the first conductor structure is arranged between the first edge and the internal circuit area and adjacent to the first edge, the second conductor structure is arranged between the second edge and the internal circuit area and adjacent to the second edge, the third conductor structure is arranged between the third edge and the internal circuit area and adjacent to the third edge, the fourth conductor structure is arranged between the fourth edge and the internal circuit area and adjacent to the fourth edge, and the first conductor structure, the second conductor structure, the third conductor structure and the fourth conductor structure are electrically connected to the processing element.

17. The risk control system as claimed in claim 16, wherein the processing element is arranged on the chip substrate.

18. The risk control system as claimed in claim 16, wherein the processing element is arranged outside the light emitting device.

19. A risk control method for traffic devices, comprising the steps of:

providing a light emitting device;

providing a processing element electrically connected to the light emitting device for outputting a prompt signal;

providing a user prompting element electrically connected to the processing element for receiving the prompt signal; and providing a chip electrically connected to the light emitting device, wherein the chip includes:

a chip substrate having an edge area; and a conductor structure arranged on the edge area, wherein the conductor structure is electrically connected to the processing element.

* * * * *